United States Patent Office 3,597,450
Patented Aug. 3, 1971

3,597,450
PREPARATION OF GLYCOLIDE POLYMERIZABLE INTO POLYGLYCOLIC ACID OF CONSISTENTLY HIGH MOLECULAR WEIGHT
Edward Emil Schmitt, Norwalk, Conn., Rocco Albert Polistina, Port Chester, N.Y., and Martin Epstein and David Anthony DeProspero, Norwalk, Conn., assignors to American Cyanamid Company, Stamford, Conn.
No Drawing. Continuation-in-part of abandoned application Ser. No. 615,931, Feb. 14, 1967. This application Nov. 5, 1969, Ser. No. 874,403
Int. Cl. C07d 15/12, 15/16
U.S. Cl. 260—340.2
10 Claims

ABSTRACT OF THE DISCLOSURE

Whereas recrystallization alone, or sublimation alone, of impure glycolide does not, in the majority of cases, render glycolide sufficiently pure to permit its polymerization into polyglycolic acid of the high molecular weight variety required for use as an absorbable surgical suture or ligature, it is surprisingly found that when impure glycolide is subjected to the dual sequential steps of recrystallization and sublimation, the glycolide produced is sufficiently pure to produce consistently high molecular weight polyglycolic acid, provided the sublimation step follows the recrystallization step.

CROSS REFERENCES TO RELATED APPLICATIONS

The present application is a continuation-in-part of our application Ser. No. 615,931, filed Feb. 14, 1967, now abandoned.

BACKGROUND OF THE INVENTION

United States Pat. No. 3,297,033, incorporated herein by reference, teaches the preparation of absorbable surgical sutures and ligatures from polyglycolic acid thereby providing a long sought after substitute for the catgut sutures which have been historically used for this purpose. Polyglycolic acid can be conveniently prepared by the catalytic polymerization of purified glycolide as taught by Lowe in U.S. Pat. 2,668,162 or by Schmitt et al. in U.S. Pat. 3,442,871, and indeed this represents a preferred route for preparing the polyglycolic acid best suited for use as absorbable sutures.

Glycolide monomer is typically prepared by condensing commercial glycolic acid to form low molecular weight polyglycolic acid which is then thermally cracked to produce a crude glycolide distillate which is laden with impurities. The glycolide is then recrystallized in relatively pure form from the distillate.

It is known that the catalytic polymerization of glycolide into polyglycolic acid is an extremely sensitive polymerization. The presence of even minute amounts of impurities in the glycolide can produce a substantial adverse effect upon the consistency of the molecular weight of the polymer. For example, Lowe in U.S. Pat. 2,668,162 expressly teaches that the presence of water or acid impurities in glycolide tends to retard polymerization to the point that the polymer does not have a molecular weight high enough for extrusion into filaments. Lowe further points out that polymerization of impure glycolide produces polymers having a melt viscosity below 400 poises while polymerization of pure glycolide produces a polymer having melt viscosities up to 50,000 poises and, in so doing, is defining low molecular weight and high molecular weight polyglycolic acid respectively.

In order for polyglycolic acid to be useful as a surgical suture or ligature, it is essential that it have a high molecular weight, i.e. in the range of 10,000 or more as taught in U.S. Pat. 3,297,033 cited above. Low molecular weight polymer produces sutures which fail to consistently retain a sufficiently high tensile strength after they are implanted in living tissue for the time period generally considered acceptable by the medical profession, i.e. up to about 15 days. It should be apparent therefore that the purity of the glycolide monomer must be such as to insure production of polyglycolic acid of consistently high molecular weight.

A test procedure has been developed by those skilled in the art to determine whether a given sample of glycolide will polymerize into polyglycolic acid of sufficiently high molecular weight to be useful as a surgical suture. This procedure is known as the "ball drop" test and produces a quantitative value for each sample of glycolide tested which is known as a "ball drop time." A detailed description of the test method and of the theory behind the test may be found in Example 1 of U.S. Pat. 3,442,871 which is incorporated herein by reference. The test procedure is briefly described as follows:

A weighed sample of glycolide is placed in a tube sealed at its lower end and containing a small magnetic steel ball. To the glycolide composition, there is added 0.0013%, by weight, based on the weight of the glycolide composition, of stannous chloride dihydrate as a catalyst and 0.66%, by weight, same basis, of lauryl alcohol. The tube is then evacuated and sealed at its upper end. The tube is placed vertically in a chamber heated to about 222° C. and the viscosity of the polymerizing glycolide is measured by the drop time in seconds per inch of the free falling ball over a 120 minute period. A peak viscosity is generally reached within about 120 minutes. The drop time at the point of peak viscosity is the "ball drop time."

We have found that if the glycolide produces a ball drop time of at least about 550 seconds/inch, it will produce polymer which is of sufficiently high molecular weight for use as an absorbable suture or ligature. If the ball drop time is below about 550 seconds/inch, the molecular weight of the polymer is not sufficiently high for use as an absorbable suture. The problem thus becomes to provide a process for purifying glycolide from the crude form in which it is ordinarily prepared to a purified glycolide consistently characterized by a ball drop time of at least about 550 seconds/inch. It is an object of this invention to provide such a process.

As used throughout this specification, the term "substantially pure glycolide" means any glycolide characterized by a ball drop time of at least 550 seconds/inch. The term "impure glycolide" means any glycolide composition containing materials which hamper the polymerization of the glycolide and which is characterized by a ball drop time of less than 550 seconds/inch.

It is generally known that monomers are preferably purified in some conventional manner before they can be polymerized into a polymer of desirable properties. However, it has been found that due to the extreme sensitivity of the polymerization of glycolide to polyglycolic acid that conventionally purified glycolide monomer cannot be sufficient purified to produce glycolide which consistently has the required ball drop time of at least about 550 seconds/inch. For example, it has been found that single or even repeated recrystallizations of impure glycolide from known glycolide recrystallization solvents such as t-amyl alcohol, ethyl acetate, isopropanol, and such will ordinarily produce a glycolide which, while seemingly quite pure chemically, produces ball drop times ranging from about 4 to 450 seconds/inch and, in most cases, from 40–300 seconds/inch. Occasionally a ball drop time in excess of 550 seconds/inch is produced but the problem is that such acceptable ball drop times cannot be consistently produced and, in the vast majority of cases, the ball drop time is well below 550. It becomes apparent that recrystallization, while effective in removing most of the impurities, leaves behind small traces of impurities or occluded recrystallization solvent which are difficult to remove and which have a profound effect upon the molecular weight of the polymer which is most unexpected.

Attempts to purify impure glycolide by sublimation alone have been similarly unavailing resulting in glycolide ball drop times of 2–200 seconds/inch.

In view of the foregoing, it was most surprising to find that it is possible to consistently produce substantially pure glycolide having a ball drop time of at least 550 seconds/inch by performing upon impure glycolide a unique combination of purification steps in accordance with the process of this invention.

SUMMARY OF THE INVENTION

This invention relates to a process for consistently preparing substantially pure glycolide eminently suitable for polymerization into polyglycolic acid of sufficiently high molecular weight for use as an absorbable surgical suture or ligature. More particularly, such glycolide is prepared by subjecting impure glycolide to one or more recrystallizations from an appropriate solvent whereupon the glycolide crystals are recovered and thereupon subjected to a sublimation process under prescribed conditions. Whereas recrystallization alone or sublimation alone fail to consistently produce glycolide having the requisite ball drop time of at least about 550 seconds/inch, the combination of the two steps, in the order given above, surprisingly produces glycolide which consistently has a ball drop time of at least about 550 seconds/inch, and typically 590–700 seconds/inch and as high as about 1200 seconds/inch.

A further surprising feature of this invention is that the sublimation step must be the last step in the purification procedure if acceptable glycolide is to be obtained. In cases where the sublimation step was followed by a recrystallization step, acceptable glycolide was not consistently produced.

In accordance with the process of this invention, impure glycolide is dissolved in an inert solvent which is capable of saturation with respect to glycolide below the melting point of glycolide. Recrystallization of the glycolide is thereupon effected, ordinarily by cooling the solution. The glycolide crystals produced, which are partially purified, are then recovered. These crystals may then be recrystallized one or more times. This recrystallized partially purified glycolide, still containing some small measure of impurities, is introduced into a suitable vessel in a layer on a surface within the vessel, whereupon the glycolide is heated at a temperature between about 75° C. and 130° C. at an absolute pressure not greater than about 2.5 mm. of mercury. Within the closed vessel, there is positioned vertically immediately above the layer of the partially purified glycolide composition a cooling surface which is positioned a distance of not greater than about 10 inches from the heated layer and which cooling surface is, nevertheless, physically separated from said heated layer. As the impure glycolide is heated, some of the pure glycolide material goes through a transition stage from a solid phase to the vapor phase and rises as a vapor from the solid layer and contacts the cooling surface positioned immediately above and is immediately collected in a substantially pure condition on the cooling surface. This glycolide is characterized by a ball drop time which consistently is at least 550 seconds/inch thereby rendering it suitable for polymerization into polyglycolic acid acceptable for use as an absorbable surgical suture.

DESCRIPTION OF THE PREFERRED EMBODIMENTS

The impure glycolide may arise from any one of a variety of sources and may contain a variety of impurities in varying amounts; the nature of, and the amount of impurities present is in no way critical. Typically, the impure glycolide is produced as an impure distillate from the cracking of the condensation product of glycolic acid such as described in Example A of U.S. Pat. 2,668,162. The distillate is then cooled, solidified, and ground into a powder which can then be recrystallized and sublimed. Optionally, the hot glycolide distillate may also be added directly to an agitated solvent such as, for example, t-amyl alcohol or isopropanol, maintained at 30–50° C. whereupon irregularly shaped prills of impure glycolide are formed when the hot distillate contacts the cooler solvent. Glycolide is typically collected until a slurry is produced containing 15–75% by weight glycolide and preferably about 50%. At this point, glycolide prills are recovered from the slurry, and washed twice with fresh solvent prior to performing the recrystallization and sublimation steps. If a long time interval (i.e. more than a few days) is anticipated between preparation of the impure glycolide and initiation of the purification process of this invention, it is desirable to collect the distillate in t-amyl alcohol containing less than 0.5% by weight water and free from glycolide reactive impurities since this will minimize degradation of the impure glycolide during storage.

In the recrystallization step, any number of solvents are useful as long as they have reasonable solvating power for glycolide and are essentially unreactive with glycolide. It is difficult to class the solvents that are useful into a single generic category since they include such diverse members as benzene, isopropanol, cyclohexanone, ethyl acetate, acetonitrile, diphenylsulphone, and t-amyl alcohol. As a general rule, the recrystallization solvent should possess physical characteristics which are sufficiently different from those of glycolide so that good separation of the glycolide and the solvent is accomplished under the pressure and temperature conditions of the sublimation step thereby resulting in the recovery of pure sublimed glycolide. In this connection, it is desirable that the solvent either be more volatile than glycolide or possess a molecular weight sufficiently high to produce a material which does not vaporize readily under the conditions of pressure and temperature experienced by the glycolide during sublimation.

Among the multiplicity of solvents which may be employed as recrystallization solvents in the process of this invention are the secondary alcohols such as isopropanol, cyclohexanol, cyclopentanol, and dicyclopropyl carbinol; tertiary alcohols such as t-amyl alcohol, t-butanol, 1-methylcyclohexanol, and cyclohexyl dicyclopropyl carbinol; aromatics and substituted aromatics such as benzene, toluene, xylene, anisole, chlorobenzene, m-dichlorobenzene, nitrobenzene, and chlorotoluene; ketonic solvents such as acetone, methyl ethyl ketone, methyl isobutyl ketone, cyclohexanone, and acetophennone; sulfones such as dimethylsulfone, diphenylsulfone, and tetramethylenesulfone; nitrile solvents such as acetonitrile, benzonitrile, propionitrile, cyclopropyl cyanide, dodecanedinitrile and pyruvonitrile; esters such as ethyl acetate, propyl acetate, dimethyl phthalate, methyl propionate, ethyl propionate, butyrolactone, and δ-valerolacetone; and ethers such as dioxane, tetrahydrofuran, 1,4-thioxane, n-butyl ether, and benzofuran.

Isopropanol and tertiary amyl alcohol represent preferred solvents. In the case of isopropanol, sufficient impure glycolide is added to produce a solution containing about 12–15% by weight glycolide; the solution is then heated to about its boiling point (84° C.) whereupon it is cooled to about 3–20° C., and preferably to about 20° C., to produce partially purified glycolide crystals.

A similar procedure is employed for tertiary amyl alcohol except that a 9–11% solution of glycolide is prepared and heated to about 100–110° C.

It is desirable to add an agent such as an activated carbon to assist in impurity removal. If this is done, a small amount of a filter aid is also added and the solution is filtered prior to recrystallizing the glycolide.

It is known that glycolide exists in two polyorphic forms called α-glycolide and β-glycolide respectively. α-glycolide is described in great detail in U.S. Pat. 3,457,280 while β-glycolide is similarly described in U.S. Pat. No. 3,435,008, both patents incorporated herein by reference. The α-glycolide is a very stable form and can be handled without special precaution. The β-glycolide however is extremely unstable and is particularly sensitive to moisture therefore necessitating special precautions in handling it. If the recrystallization occurs exclusively above 42° C., α-glycolide crystals form whereas if the recrystallization occurs exclusively below 42° C., β-glycolide crystals form. If, as is the preferred case, some recrystallization occurs above 42° C. and some below, it has been found that a mixture of α- and β-glycolide crystals are formed, with the α-glycolide predominate. In cases where the crystals contain some β-glycolide, it is desirable to initiate the sublimation step as soon as possible after the partially purified crystals are isolated in order to prevent their possible degradation from contact with moisture present in the environment. If there is to be a substantial time interval between isolation of the crystals and initiation of the sublimation steps, precautions are preferably taken to maintain the β-glycolide in stable form; otherwise, the product emerging from the sublimation may not be suitable for use in polymerization. The β-glycolide can be stably stored for short periods of time (2–3 days) in a dessicator or other moisture free environment. For longer storage, a recommended procedure is to immerse the crystals totally in fresh room temperature t-amyl alcohol which is substantially free from water (i.e. less than 0.5% by weight and preferably less than 0.1%) and glycolide reactive impurities. Tertiary amyl alcohol can be rendered free from glycolide reactive impurities by the simple expedient of contacting it with a small amount of glycolide for a prolonged period of time and then distilling the alcohol. This technique produces a slurry of glycolide crystals immersed in t-amyl alcohol since solubility of glycolide in t-amyl alcohol at room t emperature is quite small. When it is desired to initiate the sublimation step, the crystals are recovered from the slurry via filtration, centrifugation, or such, washed with trichloromonofluoromethane, and vacuum dried at 25° C.–35° C., whereupon the crystals are now in condition for sublimation.

At least one recrystallization is essential. Additional recrystallizations, while not essential, are often desirable, especially where the glycolide is in a highly impure state, in order to remove substantially all of the impurities prior to the sublimation step. Ordinarily, two recrystallizations are sufficient. If desired, one may engage in a third, fourth, or fifth recrystallization, etc. but, as a general rule, no appreciable amount of additional impurities is removed after the second recrystallization. The recrystallization step serves to remove the major portion of the impurities associated with the glycolide. The sublimation step removes or renders inactive those minor amounts of impurities which the recrystallization process is apparently incapable of disposing of and which, as heretofore discussed, wreck unexpected havoc upon the consistency of the molecular weight of the polymer.

When the crystals are recovered from the recrystallization solvent, they are preferably washed with additional fresh solvent and a volatile solvent such as a halogenated fluoromethane, of which trichloromonofluoromethane is quite suitable, whereupon they are vacuum dried at about 25° C.–35° C.

In carrying out the sublimation step, which must always be the last step in the glycolide purification procedure, the layer of glycolide crystals is heated to a temperature of from about 75° C. to about 130° C., and preferably at 90° C. to 100° C., under an absolute pressure which is less than about 2.5 mm. of Hg and preferably between about 0.1 and 00.1 mm. Hg.

The cooling surface is positioned vertically immediately above the partially purified glycolide crystals at a distance of not greater than about 10 inches, and yet physically separated from, the layer of crystals. It is preferred that the cooling surface be positioned at a distance of between about 1 inch and about 4 inches from the heated layer of the recrystallized partially purified glycolide composition and that said surface be positioned vertically immediately above said partially purified glycolide. The cooling surface is maintained at a temperature of about 60° C. or less and preferably at 15° C. to 20° C. The surface can be cooled by passing coolant through or over hollow portions of the comparatively large lower surface area. Ideally, cold water from a conventional tap can be circulated through or into these hollow portions by injecting the cold water through conduit leading to the cooling surface. The hollow portions are filled with the water and an outlet tube is provided so that cold water continuously enters and leaves the cooling vessel. Cooling surface temperatures as low as 1° C. to 3° C. are obtainable when cold water is used as the coolant. However, one could use a refrigerant which has a melting point significantly below 0° C. and, as a consequence, would still be in a liquid state and would provide for the use of temperatures below 0° C.

In operation, the partially purified glycolide crystals from the recrystallization step are heated whereupon some of the pure glycolide goes through a transition stage from a solid phase to the vapor phase and rises as a vapor from the solid layer and contacts the cooling surface positioned immediately above and is immediately collected as substantially pure glycolide on the cooling surface. The glycolide recovered from the cooling surface consistently has a ball drop value of at least 550 inches/second and can thereupon be polymerized into polyglycolic acid which, when fabricated into sutures, possesses sufficient in vivo strength retention to meet the requirements of the medical profession.

The following examples are provided to further illustrate the invention.

EXAMPLE 1

This example demonstrates that recrystallization alone, and even as many as three recrystallizations, will not produce glycolide having a ball drop time of at least 550 sec./inch unless the recrystallizations are followed by a sublimation step.

Into a suitable vessel are added about 26 grams of commercial glycolic acid which is heated to 170–180° C. at atmospheric pressure to distill off water. The pressure is then slowly reduced to the equivalent of 5 mm. of Hg and the vessel maintained at the temperature indicated until water ceases to distill. The resultant mixture is then allowed to cool, recovered, and ground into powder. About 18 grams of the powder are slowly added to a pyrolysis chamber maintained at a temperature of about 250–285° C. and a pressure of less than 15 mm. Hg. The hot distillate was collected in a suitable receiver, cooled, and solidified.

16 grams of the impure glycolide were ground into fine particles and then dissolved in 16 ml. of ethyl acetate at the boiling point of the solvent. The solution was cooled to about 20° C. and the crystals separated from solution and washed with ether to yield 73% of the glycolide. The crystals were thereupon dissolved in 130 ml. of isopropanol at the boiling point of the solvent whereupon the solution was slowly cooled to about 20° C. producing crystals which were washed with ether and dried to yield 87% of the glycolide. These crystals were then recrystallized again from ethyl acetate as described above and recovered, washed, and dried with a yield of about 75%.

3.5 grams of the three times recrystallized glycolide was then placed onto the flat bottom surface of a glass sublimer. The glycolide was pressed flat in a substantially uniform layer on the bottom of the sublimer. A top, consisting of an integral cold finger unit, is positioned on the sublimer bottom and sealed. The cold finger is then raised vertically immediately above the sublimand so as to provide a distance between the bottom of the cold finger and the sublimand of approximately 2 inches. The sealed sublimer unit is then placed in an oil bath heated to 90° C. The sublimer is connected to a vacuum system, and cold water at 8° C. is begun flowing through the cold finger. The vacuum pump is started and the oil bath temperature controller is set at 99° C. After a few minutes, the system pressure is reduced to an absolute pressure of 0.5 mm. of mercury. Fifteen minutes after starting the vacuum pump, the system pressure had reached an absolute pressure of 0.08 mm. of mercury and the sublimand started to melt. After two hours, the oil bath temperature has reached 99° C. and the pressure is 0.07 mm. of mercury, absolute. The sublimand at this time had become completely melted. After 17½ hours, the sublimation is discontinued. The system is vented to atmospheric pressure and the unit is cooled. The cover is then removed and the sublimate is scraped from the cold surface as a cake of hard crystals approximately 1 inch thick. 3.3 parts of glycolide are recovered as sublimate. Approximately 0.15 part of residue is recovered. A 95% portion of the glycolide is recovered as sublimate, 4.4% as residue at the bottom and 0.5% was lost.

The sublimed an un-sublimed recrystallized glycolide samples were then subjected to the ball drop test described in greater detail hereinabove and in Example 1 of U.S. Pat. 3,442,871 in order to determine the suitability of the glycolide for polymerization into polyglycolic acid of sufficiently high molecular weight for use as an absorbable suture. Results are shown below in Table I.

TABLE I

| First recrystallization | Second recrystallization | Third recrystallization | Sublimation | Ball drop time (sec./in.) |
|---|---|---|---|---|
| Ethyl acetate | Isopropanol | Ethyl acetate | No | 250 |
| Do | do | do | Yes | 630 |

The above results clearly show the dramatic effect upon the quality of the glycolide resulting from the combined steps of recrystallization and sublimation as opposed to simple recrystallization. It is apparent that the added expedient of following up the recrystallizations with a sublimation step transforms the glycolide from monomer unsuitable for use in suture manufacture to monomer having a ball drop time well in excess of the 550 seconds/inch required to produce acceptable polyglycolic acid sutures. The above data also clearly show that repeated recrystallizations are unavailing; it is recrystallization followed by sublimation which is essential.

Substantially similar results were obtained with a variety of different recrystallization solvents employing procedures similar to that described above. Results are show below in Table II.

TABLE II

| First recrystallization | Second recrystallization | Third recrystallization | Sublimation | Ball drop time (sec./in.) |
|---|---|---|---|---|
| Ethyl acetate | t-Amyl alcohol | None | No | 120 |
| Do | do | do | Yes | 650 |
| Ethyl acetate | Benzene | None | No | 360 |
| Do | do | Benzene | No | 450 |
| Do | do | None | Yes | 900 |
| t-Amyl alcohol | t-Amyl alcohol | None | No | 40 |
| Do | do | do | Yes | 750 |
| Isopropanol | None | None | No | 15-25 |
| Do | do | do | Yes | 1,100 |

EXAMPLE 2

This example serves to illustrate the futility of sublimation alone as a vehicle for producing glycolide in sufficiently pure form for use in the preparation of acceptable polyglycolic acid sutures.

Ground impure glycolide was prepared as in Example 1 whereupon four separate samples of the glycolide were directly sublimed as in Example 1. Ball drop times were obtained on the sublimed samples and are shown below in Table III.

Table III

| Sample: | Ball drop time seconds/inch |
|---|---|
| 1 | 20 |
| 2 | 2 |
| 3 | 200 |
| 4 | 200 |

The above data show that the sublimed glycolide is completely unsuitable for use in the preparation of polyglycolic acid sutures. Similar ball drop values are observed when the sublimation conditions are altered in accordance with the teachings of this invention.

EXAMPLE 3

This example demonstrates the necessity of preforming the sublimation step as the last step in the glycolide purification process.

Ground impure glycolide was prepared as in Example 1 whereupon it was recrystallized from ethyl acetate as described in Example 1. The recovered crystals were thereupon divided into two parts. The first part was recrystallized from isopropanol and then sublimed as shown in Example 1. The second part was first sublimed and then recrystallized from isopropanol following the procedures of Example 1. The crystals collected from both steps were recovered and subjected to ball drop measurements. Results are shown below in Table IV.

Table IV

| Order of process steps: | Ball drop time (seconds/inch) |
|---|---|
| Ethyl acetate recrystallization→sublimation→ isopropanol recrystallization | 275 |
| Ethyl acetate recrystallization→isopropanol→ recrystallization→sublimation | 800 |

The data clearly show the unexpected result that, if acceptable glycolide is to be obtained, the sublimation step must always follow the recrystallization steps. Similar results are obtained using a variety of other recrystallization solvents and sublimation conditions.

EXAMPLE 4

Following substantially the same procedures as in Example 1, glycolide having a ball drop time of at least 550 seconds/inch was consistently prepared employing a variety of different recrystallization solvents in various combinations using one or more recrystallization steps. Results are shown below in Table V.

TABLE V

| First recrystallization | Second recrystallization | Sublimation | Ball drop time (sec./in.) |
|---|---|---|---|
| Ethyl acetate | Ethyl acetate | Yes | 700 |
| t-Amyl alcohol | t-Amyl alcohol | Yes | 575 |
| Do | do | Yes | 820 |
| Do | None | Yes | 750 |
| Do | t-Amyl alcohol | Yes | 775 |
| Do | do | Yes | 650 |

EXAMPLE 5

A hot glycolide distillate was prepared as shown in Example 1. The hot distillate was collected by dropping it into agitated tertiary amyl alcohol containing about 0.1% by weight water which was maintained at a temperature of about 40° C. The distillate solidified into irregularly shaped prills of impure glycolide as it contacted the cooler alcohol. Distillate was collected until the weight ratio of prilled impure glycolide to t-amyl alcohol was about one to one. The slurry of prilled glycolide in t-amyl alcohol was then stored for about a week at ambient laboratory conditions whereupon the glycolide was recovered from the alcohol, washed twice with fresh t-amyl alcohol and then dried at about 30° C. under vacuum.

A sufficient amount of dry glycolide particles were then added to fresh t-amyl alcohol to produce about a 10% by weight solution of glycolide in the alcohol. Small amounts of a filter aid and activated carbon were admixed with the solution which was heated to 100–110° C. The hot solution was then filtered and slowly cooled to 20° C. producing a crop of glycolide crystals which were recovered from the t-amyl alcohol. Half of these crystals were immediately sublimed as described in Example 1 except the crystals were heated to 90–100° C., the absolute pressure was about 0.05 mm. Hg and the temperature of the cooling surface was 15–18° C. The sublimed crystals were collected and subjected to a ball drop time measurement. The other half of the crystals from the first recrystallization were subjected to a second recrystallization from t-amyl alcohol identical to the first whereupon the recovered crystals were sublimed as described above. In both cases glycolide having a ball drop time well in excess of 550 seconds/inch was produced as shown by the data of Table VI below:

TABLE VI

| First recrystallization | Second recrystallization | Sublimation | Ball drop time (sec./in.) |
|---|---|---|---|
| t-Amyl alcohol | None | Yes | 660 |
| Do | t-Amyl alcohol | Yes | 1,025 |

The above data indicate that a single or a double recrystallization from t-amyl alcohol suffices when followed by a sublimation step.

EXAMPLE 6

The same procedure was followed as in Example 5 except t-amyl alcohol was replaced with isopropanol and the recrystallization solution contained about 14% glycolide and boiled at about 84° C. The excellent results shown below in Table VII show that isopropanol is a suitable recrystallization solvent whether single or multiple recrystallization steps are employed.

TABLE VII

| First recrystallization | Second recrystallization | Sublimation | Ball drop time (sec./in.) |
|---|---|---|---|
| Isopropanol | None | Yes | 850 |
| Do | Isopropanol | Yes | 950 |

EXAMPLE 7

Into a sublimator substantially identical to that described in Example 1, is placed 250 parts of a recrystallized partially purified glycolide composition; the composition was prepared by sequentially recrystallizing impure glycolide as prepared in Example 1 from both ethyl acetate and benzene, and drying before it was introduced into the bottom of the sublimator. The sublimer was sealed and evacuated to an absolute pressure of less than 0.05 mm. of mercury and the cold finger is maintained at 10° C. by circulating cold water. The system is then immersed in an oil bath at 93–94° C. The glycolide which remains solid under the above conditions is collected over a period of 12 hours and amounted to 235 parts of substantially pure glycolide which has a ball drop value in excess of 550 seconds/inch.

EXAMPLE 8

41 parts of a partially purified glycolide composition which had been recrystallized twice from tertiary amyl alcohol and thereupon washed with Freon 11 and dried are charged to a sublimer as described in Example 1. Following the same procedure, the sublimer is closed and the cold finger adjusted to approximately 2 inches vertically above the sublimand. The unit is lowered into an oil bath at 124° C. and the cooling temperature is 20° C. The vacuum pump is started and after five minutes the absolute pressure is 0.11 mm./Hg. After 10 minutes, the absolute pressure is 0.07 mm./Hg and the sublimand is melting. After sixteen hours, the oil bath temperature has gradually increased to 130° C. The sublimation is discontinued at this point and the absolute pressure is 0.05 mm./Hg. 39 parts of substantially pure glycolide composition are collected as a hard, one inch thick crystalline sublimate from the cold finger. There is recovered from the bottom of the sublimator 1.4 units of a tan colored material. Ninety-five percent of the feed is sublimand, 3.4% is bottoms, and 1.6% is lost. The ball drop time of the recovered glycolide exceeds 550 seconds/inch.

We claim:

1. A process for preparing substantially pure glycolide which can be polymerized into polyglycolic acid of consistently high molecular weight which comprises:
   (1) dissolving impure glycolide in an inert solvent which is capable of saturation with respect to glycolide below the melting point of glycolide, effecting recrystallization of the glycolide from the solvent, and recovering partially purified crystals of glycolide;
   (2) heating a layer of the partially purified glycolide crystals at a temperature between about 75° C. and 130° C. under an absolute pressure not greater than about 2.5 mm. of mercury while providing a cooling surface positioned vertically above the partially purified glycolide crystals at a distance of not greater than about ten inches and yet physically separated from the layer, the cooling surface being cooled to a temperature not greater than about 60° C. whereby substantially pure glycolide is sublimed from the partially purified glycolide crystals and becomes deposited as substantially pure glycolide on the cooling surface.

2. The process of claim 1 wherein the crystals produced in step (1) are recrystallized at least one more time in the same manner described in step (1) prior to performing step (2).

3. The process of claim 1 wherein the solvent is selected from the group consisting of tertiary amyl alcohol and isopropanol.

4. The process of claim 2 wherein the solvent is selected from the group consisting of tertiary amyl alcohol and isopropanol and wherein the crystals are recrystallized a total of 2 times.

5. The process of claim 1 wherein the partially purified crystals are immersed in tertiary amyl alcohol while awaiting performance of step (2) whereupon they are recovered from the tertiary amyl alcohol and subjected to step (2).

6. The process of claim 1 wherein the absolute pressure in step (2) is about 0.01 to about 0.1 mm. Hg.

7. The process of claim 1 wherein the distance in step (2) is about 1½ to 4 inches.

8. The process of claim 1 wherein the temperature of the cooling surface in step (2) is from about 15° C. to about 20° C. and the layer is heated to a temperature of from about 90° C. to about 100° C.

9. The process of claim 3 wherein the absolute pressure is about 0.01 to about 0.1 mm. Hg, the distance is about 2 to about 3 inches, the temperature of the cooling surface is from about 15° C. to about 20° C., and said layer of partially purified glycolide crystals is heated to a temperature of from about 90° C. to about 100° C.

10. The process of claim 4 wherein the absolute pressure is about 0.01 to about 0.1 mm. Hg, the distance is about 2 to about 3 inches, the temperature of the cooling surface is from about 15° C. to about 20° C., and said layer of partially purified glycolide crystals is heated to a temperature of from about 90° C. to about 100° C.

References Cited
UNITED STATES PATENTS

| | | | |
|---|---|---|---|
| 1,446,551 | 2/1923 | Dissosway | 260—706X |
| 2,602,825 | 7/1952 | Flosdorf | 260—706 |
| 2,829,155 | 4/1958 | Muench et al. | 260—706X |
| 3,442,871 | 5/1969 | Schmitt et al. | 260—340.2X |

FOREIGN PATENTS

| | | | |
|---|---|---|---|
| 38,295 | 6/1936 | Netherlands | 260—706 |

OTHER REFERENCES

Vogel, A. I., Practical Organic Chemistry (1949), p. 154.

Weissberger, A., Technique of Organic Chemistry, vol. IV, pp. 603–8.

NORMA S. MILESTONE, Primary Examiner

U.S. Cl. X.R.

260—607, 78.3R